No. 852,103. PATENTED APR. 30, 1907.
W. H. CHURCH.
MACHINE FOR MANUFACTURING SHOE OR SIMILAR LACINGS.
APPLICATION FILED JAN. 14, 1907.
10 SHEETS—SHEET 1.

Fig. 1.

WITNESSES:
Ada E. Hagerty
Chas. H. Luther Jr.

INVENTOR:
William H. Church
by Joseph A. Miller
ATTORNEY.

No. 852,103. PATENTED APR. 30, 1907.
W. H. CHURCH.
MACHINE FOR MANUFACTURING SHOE OR SIMILAR LACINGS.
APPLICATION FILED JAN. 14, 1907.
10 SHEETS—SHEET 5.

Fig. 5.

WITNESSES:
Ada C. Hagerty.
Chas. H. Luther Jr.

INVENTOR:
William H. Church
by Joseph H. Miller
ATTORNEY.

No. 852,103. PATENTED APR. 30, 1907.
W. H. CHURCH.
MACHINE FOR MANUFACTURING SHOE OR SIMILAR LACINGS.
APPLICATION FILED JAN. 14, 1907.

WITNESSES:
INVENTOR:
William H. Church
Joseph A. Miller
ATTORNEY

No. 852,103. PATENTED APR. 30, 1907.
W. H. CHURCH.
MACHINE FOR MANUFACTURING SHOE OR SIMILAR LACINGS.
APPLICATION FILED JAN. 14, 1907.
10 SHEETS—SHEET 9.

WITNESSES: INVENTOR:
William H. Church

No. 852,103. PATENTED APR. 30, 1907.
W. H. CHURCH.
MACHINE FOR MANUFACTURING SHOE OR SIMILAR LACINGS.
APPLICATION FILED JAN. 14, 1907.

WITNESSES:
Ada E. Fagerty
Chas. H. Luther Jr.

INVENTOR:
William H. Church
By Joseph A. Miller
ATTORNEY.

UNITED STATES PATENT OFFICE.

WILLIAM H. CHURCH, OF PAWTUXET, RHODE ISLAND, ASSIGNOR TO PROVIDENCE TIPPING MACHINE COMPANY, OF PROVIDENCE, RHODE ISLAND.

MACHINE FOR MANUFACTURING SHOE OR SIMILAR LACINGS.

No. 852,103.   Specification of Letters Patent.   Patented April 30, 1907.

Application filed January 14, 1907. Serial No. 352,257.

*To all whom it may concern:*

Be it known that I, WILLIAM H. CHURCH, a citizen of the United States, residing at Pawtuxet, in the county of Providence and State of Rhode Island, have invented a new and useful Improvement in Machines for Manufacturing Shoe or Similar Lacings, of which the following is a specification.

This invention has reference to an improvement in machines used in the manufacture of shoe or similar lacings and more particularly to an improvement in machines adapted to automatically tip the lacings.

The objects of my invention are to improve the product, increase the production and lessen the cost of manufacturing shoe, corset or similar lacings, and I accomplish these objects by providing a machine with mechanisms adapted to automatically feed a continuous strip of lacing material into the machine the length of one lacing, apply a double metal tip to the strip of lacing material, cut the double tip centrally and the strip of lacing material, thereby forming a tip on each end of the severed lacing material, hold the end of the lacing material, hold the completed lacing centrally, remove the stretch from the lacing, release the finished lacing and allow the same to fall into one of a plurality of arms of a rotatable lacing receiver, count the lacings, and revolve the lacing receiver the distance of one arm for each gross (144) received by the lacing receiver, all in one operation of the machine.

A further object of my invention is to simplify the construction of a machine for automatically manufacturing shoe, corset or similar lacings.

My invention consists in the peculiar and novel construction of a machine adapted to manufacture automatically from a continuous strip of lacing material shoe, corset or similar lacings, said machine having details of construction, as will be more fully set forth hereinafter and claimed.

The figures in he drawings are all shown wi h the operative parts in the position they would assume at the start of one operation of the machine to form the first complete shoe lacing of a gross of lacings.

In the drawings, $a$ indicates the bed of the machine, $b$ the frame, $c$ the main driving mechanism, $d$ the operating lever, $e$ the lacing feed arm, $f$ the lacing feed arm operating mechanism, $g$ the tip forming mechanism, $h$ the tip forming operating mechanism, $i$ the tip stock feed rolls, $k$ the feed rolls operating mechanism, $l$ the reel for holding the tip stock, $m$ the auxiliary lacing feed mechanism, $n$ the auxiliary lacing feed operating mechanism, $o$ the tip cutting mechanism, $p$ the lacing holding mechanism, $r$ the lacing holding operating mechanism, $s$ the rotatable lacing receiver, $t$ the counting mechanism, $u$ a strip of lacing material, $v$ a ribbon of thin metal tip stock, $w$ a completed lacing, 1 the driving shaft, 2 the gear shaft, 3 the cam shaft, 4 the back eccentric shaft, 5 the rock shaft in the lacing feed arm operating mechanism, 6, 7, 8 and 9 shafts in the lacing holding mechanism, and 10, 11, 12 and 13 shafts in the lacing receiver mechanism, 11, 12, and 13 of which are hollow.

Figure 1:
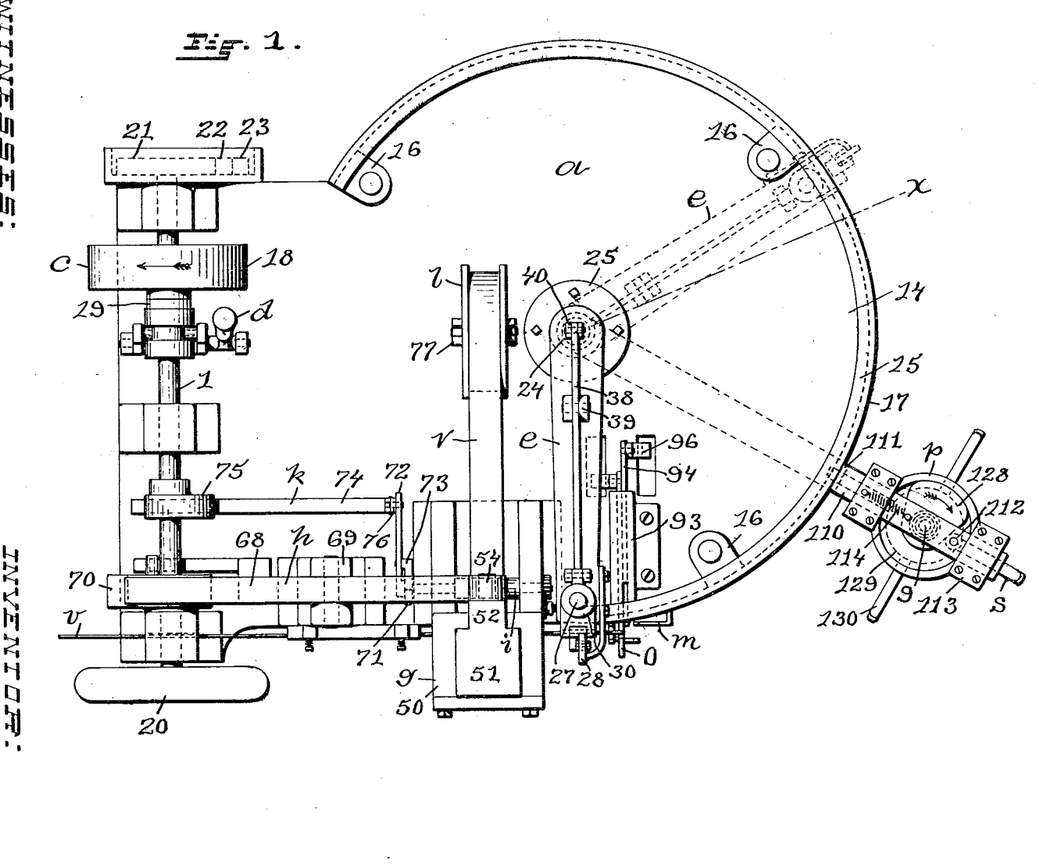
Figure 1 is a top plan view of my improved automatic machine for manufacturing shoe lacings, showing the lacing feed arm in the position it would assume at the beginning of the feed in full lines and at the end of the feed in broken lines.

The bed $a$ is shaped to have the semi-circular end 14 and to support the greater part of the operative mechanism. A semi-circular form 15, the center of which is struck on the center on which the lacing feed arm $e$ turns, is secured to the top of the bed $a$ by the supports 16 16 in a position to coincide with the semi-circular end 14 of the bed, as shown in Fig. 1 and for the strip of lacing material $u$ to be drawn by the lacing feed arm $e$ centrally around the peripheral face 17 of the form, as shown in broken lines in Fig. 2. The frame may be of any form adapted to support the bed $a$, the counting mechanism $t$ and other mechanism not supported on the bed.

Figure 4:
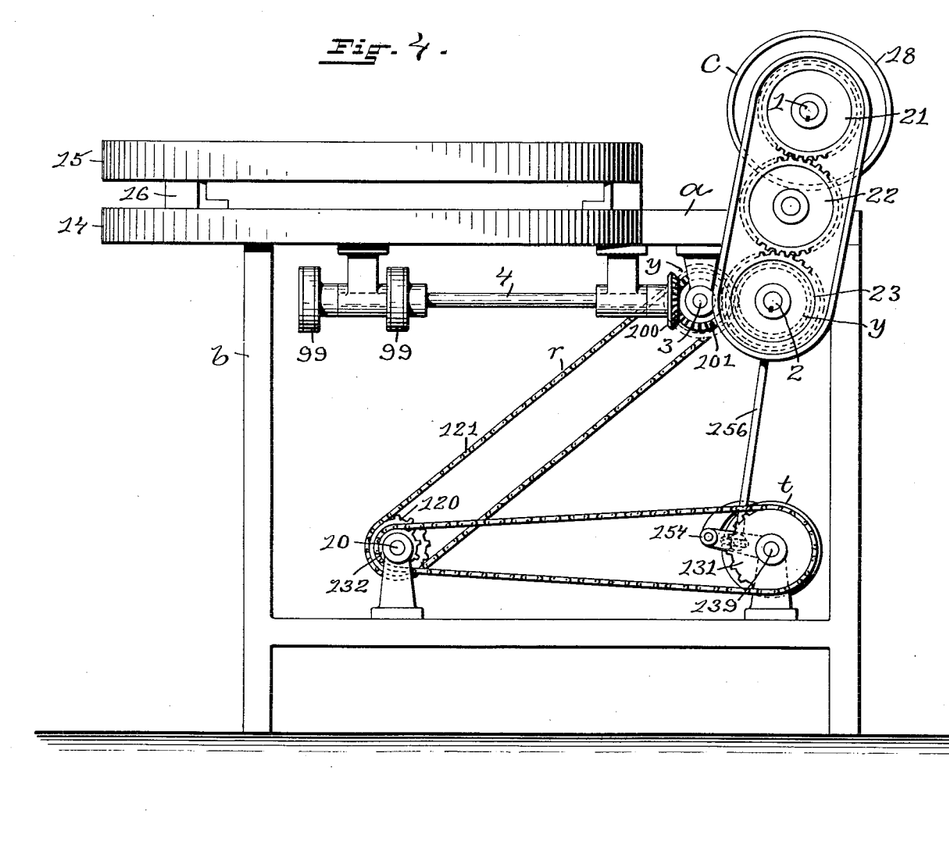
Fig. 4 is a view looking at the back of the machine, showing the means for operatively connecting the power mechanism with the back eccentric shaft.
Figure 5:
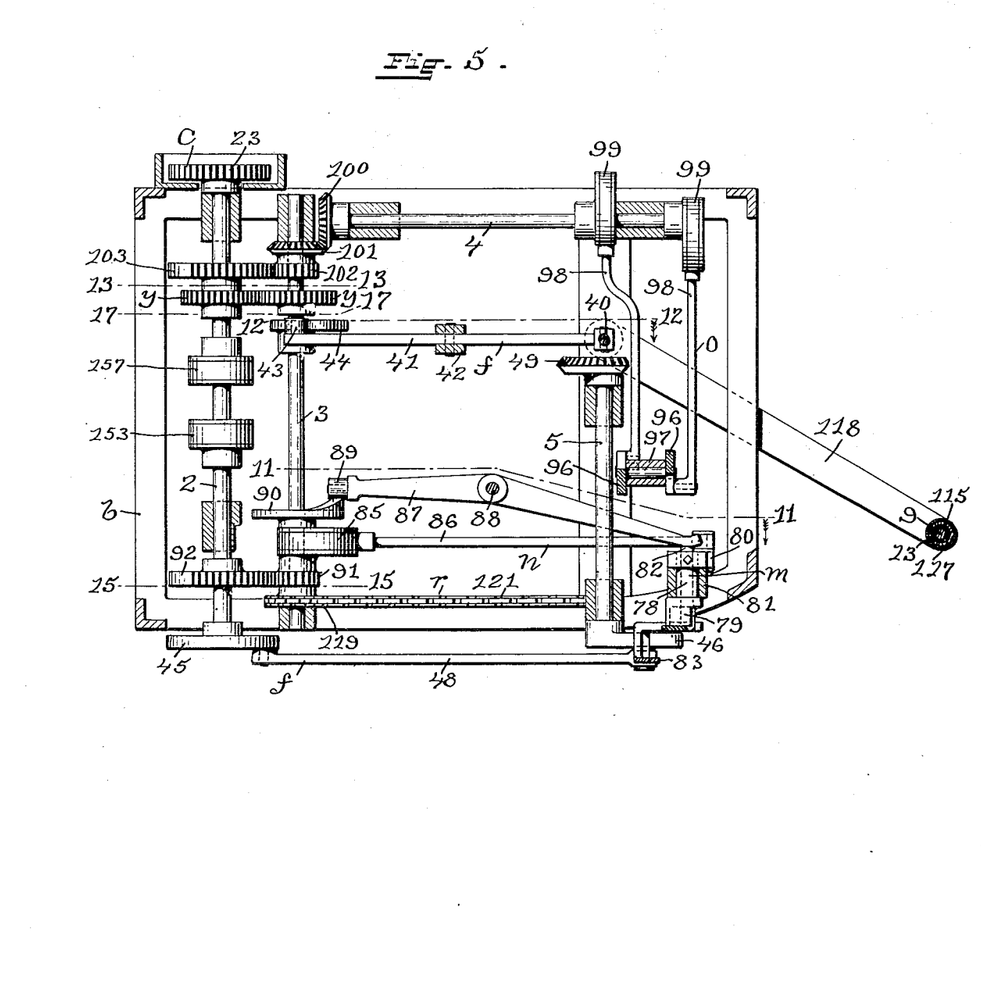
Fig. 5 is a horizontal sectional view taken on line 5 5 of Fig. 2, showing the operative mechanism under the bed of the machine.
Figure 17:
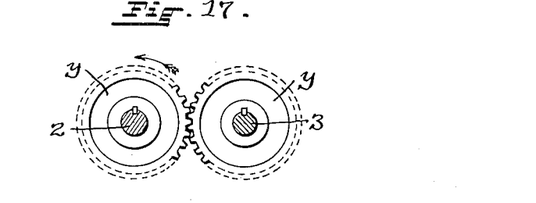
Fig. 17 is an enlarged detail sectional view taken on line 17 17 of Fig. 5, showing the gears operatively connecting the gear shaft with the cam shaft.

The driving mechanism $c$ consists of a pulley 18 rotatably supported on the driving shaft 1, a clutch 19 one member of which is secured to the pulley 18 and the other splined to the shaft 1 so that the same revolves with the shaft and may be moved longitudinally on the shaft, a balance wheel 20 secured to the forward end of the shaft, which is supported in bearings secured to the top of the bed, at the left hand end, as shown in Fig. 1, a train of gears 21, 22 and 23 connecting the driving shaft 1, at the rear, with the gear shaft 2, as shown in Fig. 4, and a gear $y$ on the gear shaft 2 meshing with a gear $y$ on the cam shaft 3, as shown in Figs. 5 and 17.

Figure 3:
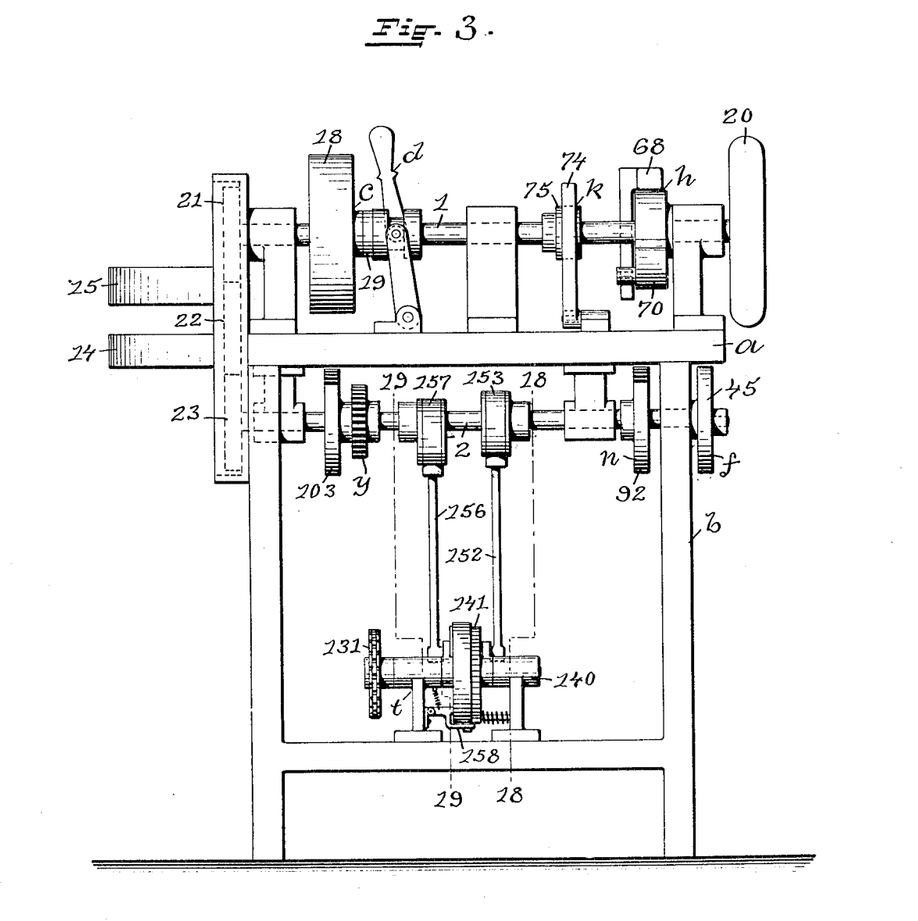
Fig. 3 is a left hand end view of the machine, showing the power and counting mechanisms.

The operating lever $d$ is pivotally secured at its lower end to the bed $a$ and is operatively connected to the movable member of the clutch 19 in the usual way, as shown in Figs. 1 and 3.

Figure 6:
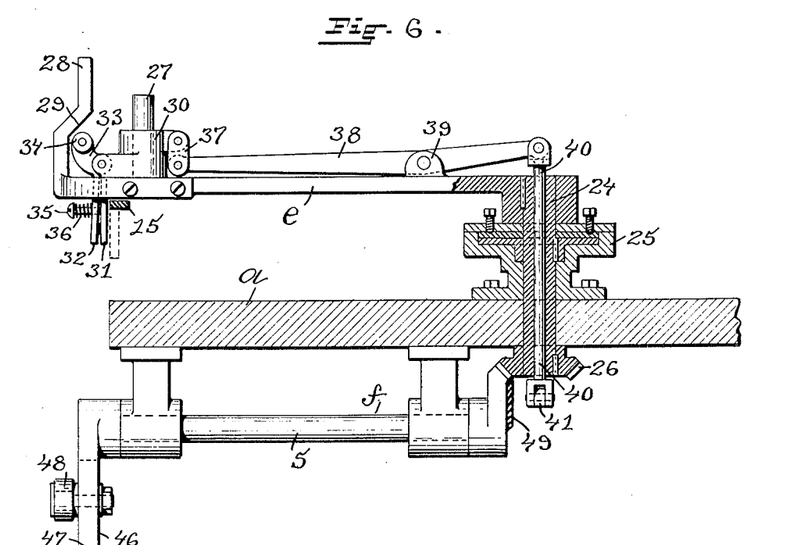
Fig. 6 is an enlarged detail sectional view taken on line 6 6 of Fig. 2, showing the construction of the lacing feed arm and part of its operating mechanism.
Figure 12:
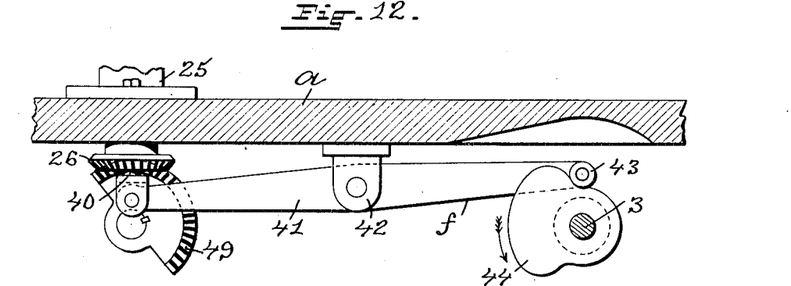
Fig. 12 is an enlarged detail sectional view taken on line 12 12 of Fig. 5, showing the means of operating the lacing feed arm.

The lacing feed arm $e$ is secured at its inner end in a horizontal position to a vertical hollow shaft 24 which extends downward through the bed $a$ and is supported by a vertical bearing 25 on the bed in a position to bring the hollow shaft 24 in the center of the semi-circular end 14 of the bed. A bevel gear 26 is secured to the lower end of the vertical shaft 24, as shown in Fig. 6. The arm $e$ extends outward over the semi-circular form 15 and has on its outer end the vertical stud 27 and the cam member 28 which has the inwardly and upwardly inclined cam surface 29. A slide 30 on the stud 27 is constructed to have the fixed clamping jaw 31 which extends downward over the end of the arm $e$ and the peripheral face 17 of the form 15, a pivoted clamping jaw 32 having the upwardly-extending arm 33 on the upper end of which is a roll 34 adapted to engage with the cam surface 29 to open the jaw, a screw 35 extending through a hole in the jaw 32 into the fixed jaw 31, a coiled spring 36 on the screw intermediate the head of the screw and the jaw 32 the tension of which holds the jaws in the closed position and a link 37 pivotally secured to the back of the slide. A lever 38 is pivotally secured adjacent its inner end to the bifurcated lug 39 on the top of the arm $e$. This lever 38 extends lengthwise with the arm $e$ and is pivotally secured at its outer end to the link 37 and at its inner end to a yoke which is rotatably secured to the rod 40 which extends downward through the hollow shaft 24. A lever 41 is pivotally secured to a bifurcated lug 42 on the under side of the bed $a$. This lever 41 is pivotally secured at one end to the lower end of the rod 40 and has a roll 43 in engagement with a cam 44 on the cam shaft 3, as shown in Fig.

12. This cam 44 is shaped and set to operate the lever 41, the rod 40, the lever 38, and the link 37 to raise the slide 30 to open the clamping jaw 32 against the tension of the spring 36 by the roll 34 engaging with the cam surface 29 to hold the clamping jaw open on the backward movement of the lacing feed arm e to allow the slide 30 to resume its normal position, by the force of gravity, and the clamping jaw 32 to close and clamp the lacing and hold the same until the arm e has reached its outward limit of movement, as shown in broken lines in Fig. 1, and returned to a position as indicated by the broken line X in Fig. 1, thereby feeding or drawing the lacing around the semi-circular form 15 and eliminating the stretch in the lacing before the same is released from the clamping jaws.

Figure 2:
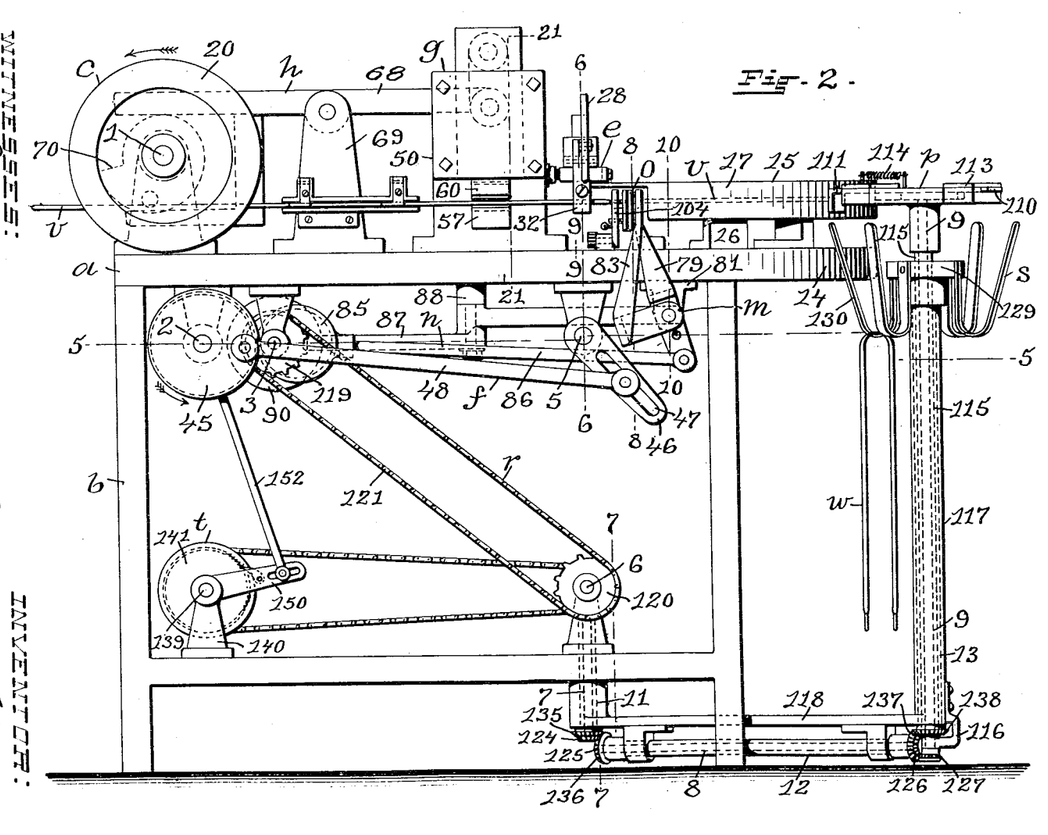
Fig. 2 is a front view of the machine, showing a portion of a continuous strip of lacing material in the machine and a completed lacing held on one of the arms of the rotatable lacing receiver, to illustrate the operation of the receiver.

A lacing feed arm operating mechanism f consists of a disk 45 secured to the forward end of the gear shaft 2, the rock shaft 5 supported in bearings on the underside of the bed a parallel with the gear shaft 2 and on a line with the center on which the lacing feed arm e turns, a downwardly-extending arm 46 having the slot 47 and secured to the forward end of the rock shaft, a connecting rod 48 operatively connecting the disk 45 with the arm 46, as shown in Fig. 2, and a segmental bevel gear 49 secured to the inner end of the rock shaft 5 and meshing with the bevel gear 26 on the lower end of the hollow shaft 24, as shown in Fig. 6, whereby the clamping jaws 31 and 32 on the lacing feed arm e are given a circular reciprocating motion to feed or carry the lacing material around the semi-circular form 15 the length of one lacing, return and repeat the operation.

Figure 21:
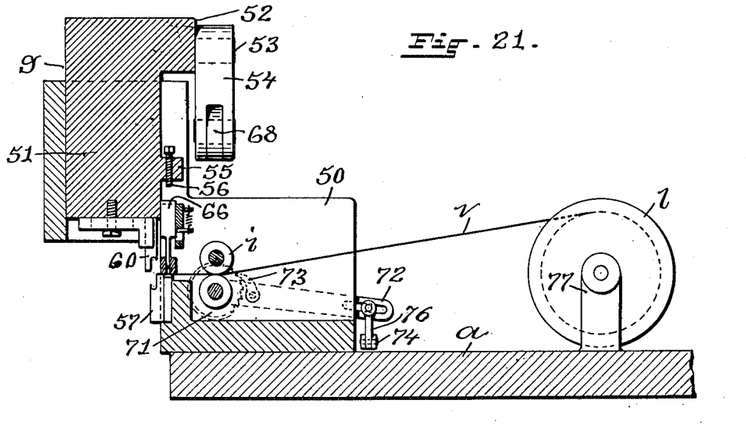
Fig. 21 is an enlarged detail sectional view taken on line 21 21 of Fig. 2, showing the tip forming mechanism, the tip stock feed rolls, the means for revolving the rolls and the reel for holding the strip of tip stock.
Figure 22:
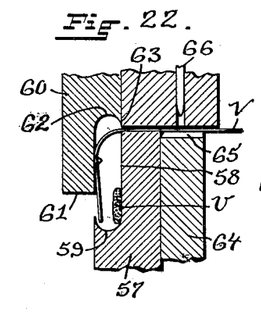
Fig. 22 is a still further enlarged detail sectional view through the cutting and tip forming dies, showing the dies in the open position, a strip of lacing material in the dies, the end of the tip stock in the dies in the position to be cut off and formed around the strip of lacing material and the indenturing dies in the open position.
Figure 23:
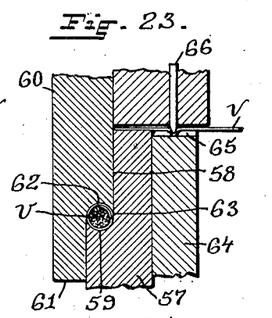
Fig. 23 is a sectional view similar to Fig. 22, showing the dies in the closed position, the piece of tip stock cut off and formed around the strip of lacing material forming a double tip on the same and the indenturing dies in the closed position to indenture the next piece of tip stock.
Figure 24:
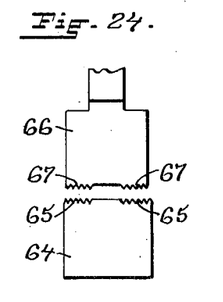
Fig. 24 is an enlarged face view of the indenturing dies removed from the tip forming mechanism.
Figure 25:
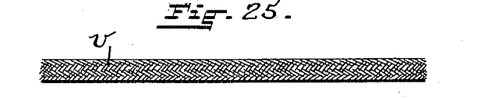
Fig. 25 is a detail view of a piece of lacing material, showing the same as it enters the machine.

The tip forming mechanism g comprises a frame 50 supporting a vertical reciprocating plunger 51 and secured to the bed a in a position to bring the plunger over the front of the bed to the left of the lacing feed arm e, as shown in Fig. 1. A boss 52 on the back of the plunger at the top carries a stud 53 to which is pivotally secured a link 54. A lug 55 is formed on the back of the plunger through which an adjustable bolt 56 extends, as shown in Fig. 21. A fixed lower die 57 is secured to the face of the frame 50 under the plunger and has a depressed face 58 merging downwardly into a semi-circular bottom recess 59 which extends transversely across the die. An upper die 60 having the downwardly projecting end 61 and the semi-circular top recess 62 which extends transversely across the die and forms a cutting edge 63, is secured to the lower end of the plunger 51. The semi-circular recesses 59 and 62 form a circular recess when the dies are closed. The end 61 of the upper die in its downward movement strikes the end of the tip stock v and bends it over and into the bottom semi-circular recess 59 in the lower die, as shown in Fig. 22. The cutting edge 63 of the upper die now cuts off the double tip blank and the recesses in the dies form the double tip by forcing the tip blank around the strip of lacing material u, as shown in Fig. 23. A fixed die 64, having the indentures 65 65 in its upper edge, is secured to the frame 50 back of the die 57 and a vertical reciprocating die 66 having the points 67 67 on its lower edge is held under spring tension between the plunger 51 and a portion of the frame 50 over the fixed die 64, as shown in Fig. 21. A downward movement of the plunger causes the bolt 56 to strike the reciprocating die 66 and force the points 67 67 into the tip stock, thus forming points on the inside of the tip to assist in securing the tips to the lacings.

The tip forming operating mechanism h consists of a lever 68 pivotally secured adjacent its center to a support 69 which is secured to the top of the bed a intermediate the plunger 51 and the driving shaft 1, as shown in Figs. 1 and 2. The inner end of the lever 68 is pivotally secured to the link 54 on the plunger 51 and the outer end of the lever engages with a cam 70 on the driving shaft. The operation of the cam 70 through the lever 68 and link 54 gives a vertical reciprocating motion to the plunger 51. The tip stock feed rolls i are rotatably supported in the frame 50 in a position to feed the tip stock v between the dies 57 and 60.

The feed roll operating mechanism k consists of a ratchet 71 secured to the shaft of the lower feed roll, a lever 72 loosely mounted on the feed roll shaft and carrying a pawl 73 in a position to engage with the ratchet 71, as shown in broken lines in Fig. 21, a bell crank lever 74 pivotally secured to the bed a, as shown in Fig. 3, in a position for the outer end to engage with a cam 75 secured to the driving shaft 1. The inner end of the bell crank lever 74 is pivotally connected to a link 76 which in turn is pivotally secured to the pawl lever 72, as shown in Figs. 1 and 21. By this construction, for each revolution of the cam 75 on the driving shaft 1, the feed rolls i are revolved to feed the tip stock v from the reel l to the dies 57 and 60, a distance the equivalent of one double tip.

The tip stock reel l is rotatably supported on the bearing 77 secured to the top of the bed a in a position to feed the ribbon of tip stock v to the feed rolls i, as shown in Figs. 1 and 21.

Figures 8, 9, 10:
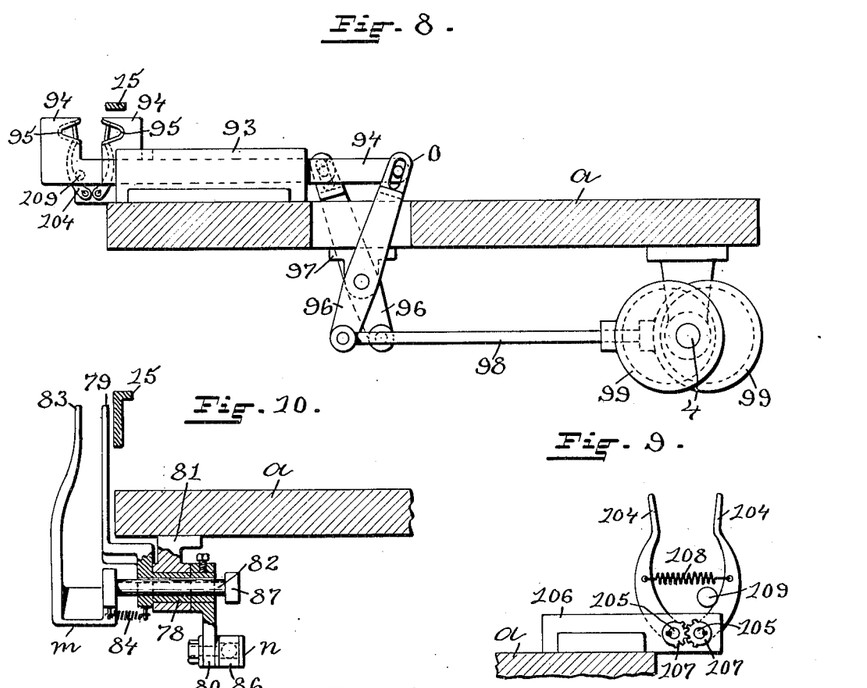
Fig. 8 is an enlarged detail sectional view taken on line 8 8 of Fig. 2, showing the tip cutting mechanism.
Fig. 9 is an enlarged detail sectional view taken on line 9 9 of Fig. 2, showing the automatic lacing material holding device.
Fig. 10 is an enlarged detail sectional view taken on line 10 10 of Fig. 2, showing the construction of the auxiliary lacing feed mechanism.

The auxiliary lacing feed mechanism m consists of a sleeve 78 having on its forward end an upwardly-extending clamping jaw 79, on its inner end the downwardly-extending arm 80 and rotatably supported in a bearing 81, as shown in Fig. 10, in a position for the clamping jaw 79 to extend upward over the peripheral face 17 of the semi-circular form 15 adjacent to and to the right of the tip cutting mechanism o, as shown in Fig. 2. A shaft 82 extending through the sleeve 78 is splined to the sleeve so that it rotates with the sleeve and may have a longitudinal reciprocating movement in the sleeve, an upwardly-extending clamping jaw 83 secured to the forward end of the shaft 82 in a position to coincide with the clamping jaw 79 and a coiled spring 84 secured at its ends to the base of the clamping jaws 79 and 83, as shown in Fig. 10.

Figure 11:
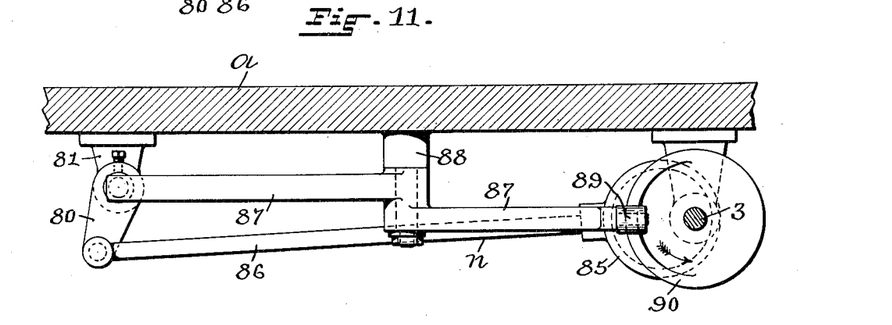
Fig. 11 is an enlarged detail sectional view taken on line 11 11 of Fig. 5, showing the means of operating the auxiliary lacing feed mechanism.
Figure 15:
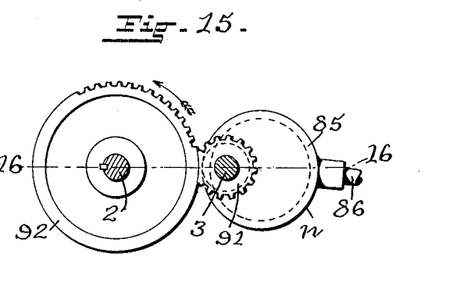
Fig. 15 is an enlarged detail sectional view taken on line 15 15 of Fig. 5, showing the slip gear mechanism for giving an intermittent reciprocating motion to the auxiliary lacing feed mechanism.
Figure 16:
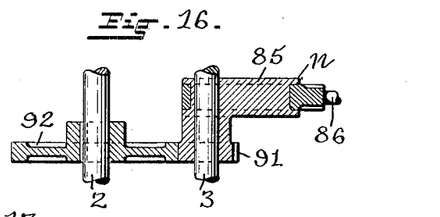
Fig. 16 is a sectional view taken on line 16 16 of Fig. 15 through the slip gears and eccentric.

The auxiliary lacing feed operating mechanism $n$ consists of an eccentric 85 rotatably supported on the cam shaft 3 and having the connecting rod 86 the end of which is pivotally secured to the arm 80 on the sleeve 78, as shown in Figs. 2 and 11, and a lever 87 pivotally secured at its center to a stud 88 on the underside of the bed $a$, one end of the lever engaging with the end of the shaft 82 in the sleeve 78 and the opposite end of the lever having a roll 89 engaging with a cam 90 on the cam shaft 3. A slip pinion 91 on the hub of the eccentric 85 is adapted to mesh intermittently with a slip gear 92 secured on the gear shaft 2, as shown in Figs. 5, 15 and 16. By this construction the clamping jaws 79 and 83 of the auxiliary lacing feed mechanism $m$ are given an intermittent circular reciprocating motion through the eccentric 85, the rod 86, and the arm 80, the clamping jaws 79 and 83 are opened to receive the lacing through the operation of the cam 90, the lever 87, and the shaft 82, and the jaws are closed onto the lacing by the tension of the spring 84 to feed or draw the lacing a sufficient distance to bring the double lacing tip on the lacing from the tip forming dies to the tip cutting mechanism $o$.

Figure 13:
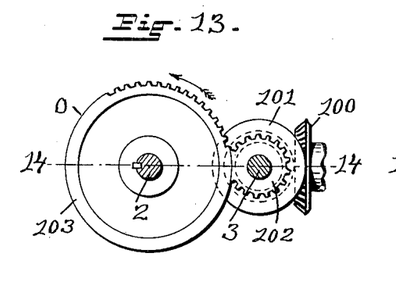
Fig. 13 is an enlarged detail sectional view taken on line 13 13 of Fig. 5, showing the slip gear mechanism for intermittently revolving the back eccentric shaft.
Figure 14:
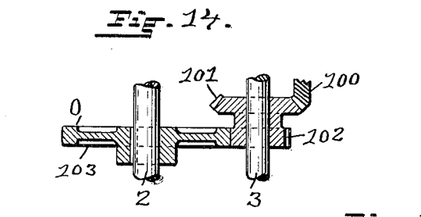
Fig. 14 is a sectional view taken on line 14 14 of Fig. 13 through the slip gears.

The tip cutting mechanism $o$ consists of a guide frame 93 secured to the top of the bed $a$ to the right of the tip forming mechanism $g$, two cutter blades 94 94 each having the oppositely-disposed V-shaped cutting edges 95 95 on their forward ends and extending through the frame 93 in a horizontal position, as shown in Fig. 8. Each cutting blade 94 is operatively connected to the upper end of a vertical lever 96 which extends downward through an opening in the bed $a$ and is pivotally secured to a support 97 secured on the underside of the bed. A connecting rod 98 is operatively connected with the lower end of each lever and to eccentrics 99 99 secured in oppositely-disposed positions on the back eccentric shaft 4, as shown in Fig. 8. A bevel gear 100 is secured on the left hand end of the back eccentric shaft 4 and meshes with a bevel gear 101 rotatably supported on the cam shaft 3. A slip pinion 102 is formed on the hub of the bevel gear 101 and meshes intermittently with a slip gear 103 secured on the gear shaft 2, as shown in Figs. 5, 13 and 14. By this construction the cutting blades 94 94 are given an intermittent reciprocating motion in opposite directions and are timed to cut the double tip centrally to form a tip on each end of the severed lacing, just before the clamping jaws on the lacing feed arms $e$ have returned and grasped the next lacing.

The end of the lacing material $u$ is held after the double tip is cut by two vertical clamping arms 104 104 secured at their lower ends to short shafts 105 105 supported in bearings in a block 106 secured to the top of the bed $a$ to the left of the cutting mechanism $o$. Pinions 107 107 are secured to the shafts 105 105 in a position to mesh. A coiled spring 108 is connected to each of the clamping arms 104 104, as shown in Fig. 9, and a pin 109 is secured to the adjacent cutting blade in the tip cutting mechanism in a position to engage with the outer clamping arm 104, as shown in broken lines in Fig. 8. As the cutting blade moves forward the pin 109 on the blade engages with the outward clamping arm 104 and opens the clamping arms against the tension of the spring 108 and as the cutting blade moves in to cut the tip the clamping arms are brought together by the tension of the spring 108 and hold the severed end of the lacing material in position for the clamping jaws on the lacing feed arm $e$ to grasp the strip of lacing material.

The lacing holding mechanism $p$ comprises a slide 110 having an L-shaped end 111, a roll 112 on its underside and reciprocally supported in a frame 113 in a position for the L-shaped end to hold the lacing centrally on the peripheral face 17 of the semi-circular form 15 through the tension of a coiled spring 114, operatively connected with the slide 110 and the frame 113, as shown in Figs. 1 and 2. The frame 113 is rigidly secured to the upper end of a vertical tube 115 which is secured at its lower end to a bracket 116 which in turn is secured to an outer vertical tube 117 surrounding the tube 115 on the outer end of and forming a part of a swinging frame 118 which is pivotally secured at its inner end to the frame $b$ in a position to bring the pivot of the swinging frame 118 on a vertical line with the center on which the lacing feed arm $e$ turns, as shown in Figs. 1 and 2.

The lacing holding operating mechanism $r$ consists of a sprocket 119 on the cam shaft 3, a sprocket 120 on the shaft 6, a chain 121 connecting the sprockets 119 and 120, a bevel gear 122 meshing with a bevel gear 123 on the upper end of the vertical shaft 7, a bevel gear 124 on the lower end of the vertical shaft 7 meshing with a bevel gear 125 on the inner end of the horizontal shaft 8 on the swinging frame 118, a bevel gear 126 on the outer end of the horizontal shaft 8 meshing with a bevel gear 127 on the lower end of the vertical shaft 9 which extends upward through the tube 115, the frame 113 and has on its upper end a cam 128 in the frame 113 under the slide 110, as shown in Figs. 1 and 2. By this construction the cam 128 is revolved and timed to engage with the roll 112 on the slide 110 to move the slide outward on the outward movement of the lacing feed arm e and to release the slide and allow the same through the tension of the spring 114 to hold the lacing centrally between the L-shaped end on the slide and the peripheral face of the form, until the lacing feed arm e has come back to the line X in Fig. 1 to eliminate the stretch in the lacing and the tip is cut, when the cam 128 operates to move the slide 110 outward and allow the lacing to drop onto one of the arms of the lacing receiver s.

Figure 7:
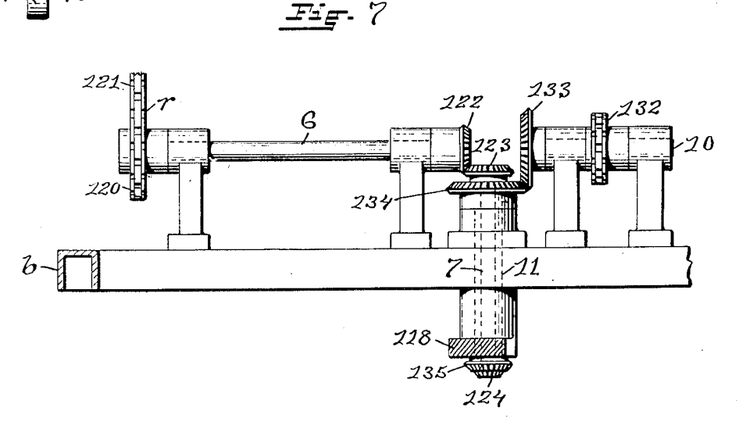
Fig. 7 is an enlarged detail sectional view taken on line 7 7 of Fig. 2, showing the lacing receiver operating shaft.

The lacing receiver s consists of a circular hub 129 having four upwardly-extending hook-shaped arms 130 130, the upper ends of which move in a circular path slightly under the semi-circular form 15. The hub 129 is secured to the upper end of the hollow vertical shaft 13 in the outer vertical tube 117 and is given a quarter turn at predetermined intervals by a sprocket 131 on the shaft of the counting mechanism t, connected by a chain to a sprocket 132 on the shaft 10, a bevel gear 133 on the shaft 10 meshing with a bevel gear 134 on the upper end of the hollow vertical shaft 11, a bevel gear 135 on the lower end of the hollow shaft 11 meshing with a bevel gear 136 on the inner end of the hollow horizontal shaft 12 and a bevel gear 137 meshing with a bevel gear 138 on the lower end of the hollow vertical shaft 13, as shown in Figs. 2, 4 and 7.

Figure 18:
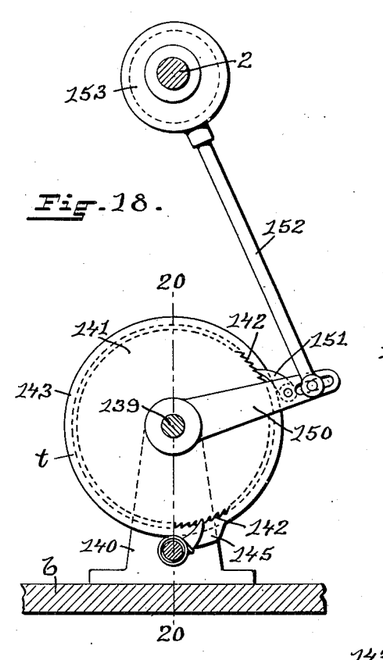
Fig. 18 is an enlarged detail sectional view taken on line 18 18 of Fig. 3 of the counting mechanism looking at the front of the machine.
Figure 19:
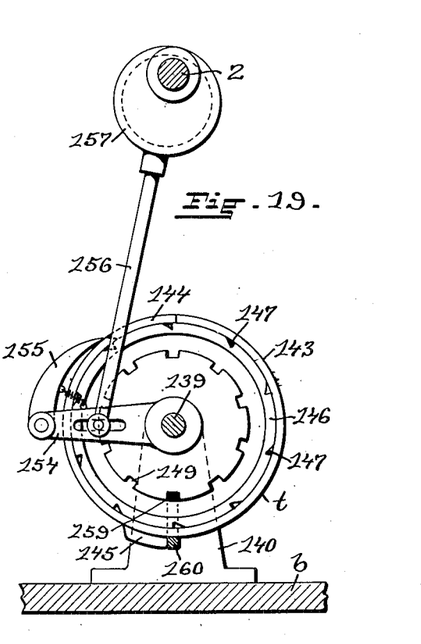
Fig. 19 is a sectional view similar to Fig. 18 taken on line 19 19 of Fig. 3 of the counting mechanism looking at the back of the machine.
Figure 20:
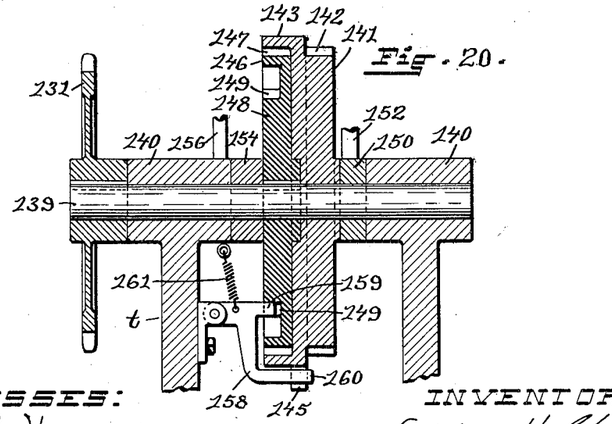
Fig. 20 is a still further enlarged detail sectional view through the counting mechanism taken on line 20 20 of Fig. 18.

The counting mechanism t consists of a shaft 139 supported on the bearings 140 140 secured to a cross strut of the frame b under the gear shaft 2, as shown in Fig. 3. A ratchet disk 141 having one hundred and sixty (160) of the ratchet teeth 142 142 on its periphery, the peripheral flange 143 in which is the opening 144 the length of which is the equivalent of sixteen (16) of the ratchet teeth 142 142 and the cam 145 extending radially from the periphery, is loosely mounted on the shaft 139, as shown in Fig. 20. A disk 146 having ten (10) notches 147 147 in its periphery and a hub 148 having ten (10) recesses 149 149 in its periphery, are firmly secured to the shaft 139. A lever 150 is loosely mounted on the shaft 139 adjacent the ratchet disk 141 and a pawl 151 is pivotally secured to the lever in a position to engage with the ratchet teeth 142 142 on the disk 141, as shown in Fig. 18. A connecting rod 152 connects the free end of the lever 150 with an eccentric 153 on the gear shaft 2. One revolution of the eccentric 153 revolves the ratchet disk 141 one tooth. A lever 154 is loosely mounted on the shaft 139 adjacent the disk 146 and a pawl 155 is pivotally secured to the lever in a position to engage with the notches 147 147 through the opening 144 in the flange of the ratchet disk 141, as shown in Fig. 19. A connecting rod 156 is connected to the lever 154 and to an eccentric 157 on the gear shaft 2. One revolution of the eccentric 157 revolves the notched disk 146 one notch and the sprocket 131 one-tenth $\frac{1}{10}$ of a revolution. A latch 158 is pivotally secured to the bearing 140 on the notched disk side and has the projecting end 159 adapted to enter the recesses 149 149 in the hub 148 of the disk and the L-shaped end 160. A coiled spring 161 is secured to the latch and to the bearing and holds the latch in its normal or locked position. The cam 145 on the ratchet disk engages with the L-shaped end 160 of the latch at each revolution of the ratchet disk 141 and depressing the latch against the tension of the spring 161 releases the projecting end 159 from a recess 149 in the disk and allows the disk, shaft and sprocket to revolve. The pawl 151 takes up one tooth on the ratchet disk 141 for each finished lacing received by the rotatable lacing receiver s. When the ratchet disk 141 has revolved one hundred and forty-four (144) teeth the cam 145 has acted to release the latch 158 and the opening 144 in the flange on the ratchet disk has come into position for the pawl 155 to pass through the opening and engage with a notch 147 on the periphery of the disk 146. The next upward movement of the pawl 155 revolves the notched disk 146, the shaft 139, and the sprocket 131 one-tenth $\frac{1}{10}$ of a revolution and through the mechanism connecting the sprocket with the rotatable lacing receiver s revolves the receiver one-quarter $\frac{1}{4}$ of a revolution, thus moving the arm that has received a gross of the finished lacings to one side and bringing an empty arm into position to receive the next gross of lacings.

Figure 26:
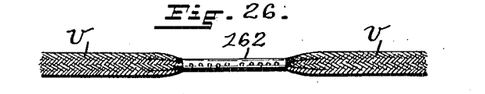
Fig. 26 is a detail view of the lacing material after the dies have formed the double tip on the same.
Figure 27:
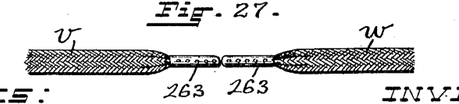
Fig. 27 is a view after the double tip and lacing has been cut by the cutting mechanism and a tip formed on each end of the severed lacing.

The tip stock v is in the form of a thin metal ribbon the width of which forms the length of a double tip 162, as shown in Fig. 26, which when cut centrally by the cutting mechanism o forms a finished tip 163 on each end of the severed lacing material, as shown in Fig. 27.

In the operation of my improved automatic machine for manufacturing shoe, corset or similar lacings, the driving mechanism c is driven by a belt on the pulley 18 in the usual way. The tip stock v is fed intermittently to the cutting and forming dies of the tip forming mechanism g. The continuous strip of lacing material u is brought preferably from a can on the floor (not shown) in which it is coiled, passed through a guide tension device on a line with the center of the dies, through the dies and the end held by the clamping arms 104 104. Starting with the operative parts in the positions as shown in the drawings, the slide 110 in the lacing holding mechanism p moves outward and simultaneously the lacing feed arm e carrying the lacing around the face of the form 15 swings around into the position, as shown in broken lines in Fig. 1, and the slide 110 comes back and holds the lacing centrally between the L-shaped end of the slide and the face of the form 15. When the lacing feed arm reaches the line X, shown in Fig. 1, on its return movement, (thus eliminating the stretch) the lacing is released from the jaws of the feed arm and before the feed arm $e$ has returned to its starting point the double tip 162 is formed on the lacing material, the lacing material grasped by the jaws of the auxiliary lacing feed mechanism $m$ and drawn in to bring the double tip centrally in the tip cutting mechanism $o$, when it is cut by the cutting blades in the mechanism to form the finished tip 163 163 on the ends of the severed lacing, and the slide 110 moves outward and allows the finished lacing to fall in the form of a loop onto one of the arms 130 130 of the lacing receiver $s$, as shown in Fig. 2. The lacing feed arm $e$ now reaches the limit of its return movement and these operations which are continuous may be repeated indefinitely. The machine may be adjusted for different lengths of lacings by adjusting the connecting rod 48 on the arm 46, adjusting the cam 44 on the cam shaft 3, or using different cams for different lengths of lacing and adjusting the frame 118 on its pivot to bring the lacing holding mechanism $p$ and the lacing receiver $s$ centrally with the lacing when stretched around the face of the form 15.

Having thus described my invention, I claim as new and desire to secure by Letters Patent;—

1. In a machine for manufacturing lacings, a driving mechanism, a lacing feed arm adapted to have a circular reciprocating movement to feed a strip of lacing material into the machine, means on the arm for grasping the strip of lacing material, means for releasing the lacing after the lacing feed arm has reached a predetermined point on its return movement, and means for operatively connecting the lacing feed arm with the driving mechanism.

2. In a machine for manufacturing lacings, a driving mechanism, a lacing feed arm having a circular reciprocating movement, an auxiliary lacing feed mechanism adapted to give an intermittent feed motion to a strip of lacing material, means for operatively connecting the lacing feed arm with the driving mechanism, and means for operatively connecting the auxiliary feed mechanism with the driving mechanism.

3. In a machine for manufacturing lacings, a driving mechanism, a counting mechanism, a rotatable lacing receiver, a swinging frame pivotally secured to the frame of the machine and operatively supporting the lacing receiver, means for operatively connecting the driving mechanism with the counting mechanism, and means for operatively connecting the counting mechanism with the rotatable lacing receiver.

4. In a machine for manufacturing lacings, a frame, a driving mechanism on the frame, a semi-circular form on the frame, means for drawing a strip of lacing material around the form, a lacing holding mechanism adapted to hold the lacing centrally against the face of the form, means for supporting the lacing holding mechanism, and means for operatively connecting the driving mechanism with the lacing holding mechanism.

5. In a machine for manufacturing lacings, a frame, a driving mechanism on the frame, a lacing feed arm adapted to have a circular reciprocating movement, an auxiliary lacing feed mechanism adapted to have an intermittent reciprocating movement, a lacing tipping mechanism adapted to form a double tip on a strip of lacing material, means for operatively connecting the driving mechanism with the lacing feed arm, means for operatively connecting the driving mechanism with the auxiliary lacing feed mechanism, and means for operatively connecting the driving mechanism with the tip forming mechanism.

6. In a machine for manufacturing lacings, a frame, a driving mechanism on the frame, means for intermittently feeding a strip of lacing material into the machine, an intermittent auxiliary lacing feed mechanism, a tip forming mechanism, a tip cutting mechanism, means for operatively connecting the intermittent auxiliary lacing feed mechanism with the driving mechanism, means for operatively connecting the tip forming mechanism with the driving mechanism and means for operatively connecting the tip cutting mechanism with the driving mechanism.

7. In a machine for manufacturing lacings, a frame having a semi-circular end, a semi-circular form on the frame, a driving mechanism on the frame, a lacing feed arm adapted to have a circular reciprocating motion over the form, jaws on the arm adapted to grasp a strip of lacing material and draw the same around the face of the form, means for operatively connecting the lacing feed arm with the driving mechanism and means for operatively connecting the jaws on the lacing feed arm with the driving mechanism, whereby the lacing is held by the jaws on the outward movement of the lacing feed arm and on the return movement until the arm has reached a predetermined point, when the lacing is released from the jaws.

8. In a machine for manufacturing lacings a bed, supported on a frame, a driving mechanism on the bed, a lacing feed arm pivotally supported on the bed, means for operatively connecting the lacing feed arm with the driving mechanism to give a circular reciprocating motion to the arm, a slide adapted to have a vertical reciprocating motion on the end of the arm, jaws on the slide adapted to grasp a strip of lacing material, means for closing the jaws on a downward movement of the slide, means for opening the jaws on an upward movement of the slide, and means for operatively connecting the slide with the driving mechanism to give a vertical reciprocating motion to the slide.

9. In a machine for manufacturing lacings, a frame, a bed supported on the frame, a driving mechanism on the bed, a lacing feed arm pivotally supported on the bed, an auxiliary lacing feed mechanism operatively supported on the bed and having arms adapted to grasp a strip of lacing material, means for operatively connecting the lacing feed arm with the driving mechanism to give a circular reciprocating motion to the feed arm, means for operatively connecting the arms of the auxiliary lacing feed mechanism to give an intermittent reciprocating motion to the arms and means for operatively connecting the arms to open and close the arms at predetermined intervals.

10. In a machine for manufacturing lacings, a frame, a bed on the frame, a driving mechanism on the bed, means for feeding a strip of lacing material into the machine, a tip forming mechanism on the bed adapted to form a double tip on the strip of lacing material, a tip cutting mechanism on the bed adapted to cut the double tip centrally and consisting of a guide frame on the bed, two cutting blades in the guide frame adapted to have reciprocating motions in opposite directions, means for operatively connecting the cutting blades with eccentrics set in oppositely-disposed positions, and means for operatively connecting the eccentrics with the driving mechanism to give an intermittent rotary motion to the eccentrics.

11. In a machine for manufacturing lacings, a frame, a bed on the frame, a driving mechanism on the bed, means for feeding a strip of lacing material into the frame, means for holding the end of the lacing material consisting of arms pivotally secured to the bed and held in the closed position by a spring, a tip forming mechanism on the bed adapted to form a double tip on the strip of lacing material, a tip cutting mechanism on the bed adapted to cut the tip centrally, means for operatively connecting the tip cutting mechanism with the arms to automatically open the jaws against the tension of the spring and release the end of the lacing material and means for operatively connecting the tip cutting mechanism with the driving mechanism.

12. In a machine for manufacturing lacings, a frame, a bed having a semi-circular end and supported on the frame, a semi-circular form secured to the bed in a position to coincide with the semi-circular end of the bed, means for drawing a strip of lacing material around the peripheral face of the form, means for forming a double tip on the strip of lacing material, means for cutting the tip centrally, a lacing holding mechanism consisting of a slide reciprocally supported in a frame, a spring secured to the slide and the frame, the tension of the spring holding the end of the slide against the strip of lacing material on the face of the form, a roll on the slide, a cam adapted to engage with the roll and move the slide outward against the tension of the spring to release the lacing, means for supporting the slide frame in its operative position, and means for operatively connecting the cam with the driving mechanism.

13. In a machine for manufacturing lacings, a frame, a bed on the frame, a semi-circular form on the bed, a driving mechanism on the bed, means for drawing a strip of lacing material around the peripheral face of the form, means for forming a double tip on the strip of lacing material, means for cutting the double tip centrally, means for holding the end of the lacing material, means for holding the strip of lacing centrally and then releasing the same, and means for receiving the released lacing, as described.

14. In a machine for manufacturing lacings, a frame, a bed on the frame, a semi-circular form on the bed, a driving mechanism on the bed, means for drawing a strip of lacing material into the machine and around the peripheral face of the form, auxiliary means for giving an intermittent feed motion to the strip of lacing material, means for forming a double tip on the strip of lacing material, means for cutting the double tip centrally, means for holding the end of the lacing material, means for holding the strip of lacing centrally and then releasing the same, and means for receiving the released lacing, as described.

15. In a machine for manufacturing lacings, a frame, a bed on the frame, a semi-circular form on the bed, a driving mechanism on the bed, means for drawing a strip of lacing material into the machine and around the peripheral face of the form, auxiliary means adapted to give an intermittent feed motion to the strip of lacing material, means for forming a double tip on the strip of lacing material, means for cutting the double tip centrally, means for holding the lacing centrally and then releasing the same, a rotatable lacing receiver, and means for giving an intermittent rotary motion to the lacing receiver at predetermined intervals, as described.

16. In a machine for manufacturing lacings, a frame, a bed on the frame, a semi-circular form on the bed, means for drawing a strip of lacing material into the machine and around the form, auxiliary means adapted to give an intermittent feed motion to the strip of lacing material, means for forming a double tip on the strip of lacing material, means for cutting the double tip centrally, means for holding the lacing centrally and then releasing the same, a rotatable lacing receiver, a counting mechanism, and means for operatively connecting the counting mechanism with the lacing receiver, as described.

17. In a machine for manufacturing lacings, a frame, a bed on the frame, a semi-circular form on the bed, a driving mechanism on the bed, mechanism adapted to draw a strip of lacing material into the machine and around the form, auxiliary mechanism adapted to give an intermittent feed motion to the strip of lacing material, mechanism adapted to form a double tip on the strip of lacing material, mechanism adapted to cut the double tip centrally, mechanism adapted to hold the end of the lacing material, mechanism adapted to hold the lacing centrally and then release the same, a rotatable lacing receiver, and a counting mechanism, as described.

18. In a machine for manufacturing lacings, the combination of the following instrumentalities: a bed $a$ supported on a frame $b$, a semi-circular form 15 on the bed, a driving mechanism $c$ on the bed operatively connected with a driving shaft 1, a gear shaft 2, a cam shaft 3, a back eccentric shaft 4 and a rock shaft 5, an operating lever $d$ operatively connected with the driving mechanism $c$, a lacing feed arm $e$ having a circular reciprocating motion and jaws adapted to grasp a strip of lacing material and draw the lacing around the semi-circular form 15, a feed arm operating mechanism $f$ operatively connecting the driving mechanism $c$ with the lacing feed arm $e$ and the jaws on the arm $e$, a tip forming mechanism $g$ adapted to form a double tip on a strip of lacing material, an operative mechanism $h$ operatively connecting the driving mechanism $c$ with the tip forming mechanism $g$, the tip stock feed rolls $i$, an operating mechanism $k$ operatively connected with the driving mechanism $c$ and the feed rolls $i$, a tip stock reel $l$, an auxiliary lacing feed mechanism $m$ adapted to give an intermittent feed motion to a strip of lacing material, an operating mechanism $n$ operatively connecting the driving mechanism $c$ with the auxiliary feed mechanism $n$, a tip cutting mechanism $o$ adapted to cut a double tip centrally and operatively connected with the driving mechanism $c$, means for holding the end of a strip of lacing material consisting of two arms pivotally secured to the bed $a$, operated by a spring, and the tip cutting mechanism $o$, a lacing holding mechanism $p$, an operating mechanism $r$ operatively connecting the driving mechanism $c$ with the lacing holding mechanism $p$, a rotatable lacing receiver $s$, a counting mechanism $t$, means for operatively connecting the counting mechanism $t$ with the driving mechanism $c$ and with the rotatable lacing receiver $s$, and means for adjusting the machine for different lengths of lacings, as described.

In testimony whereof I have signed my name to this specification in the presence of two subscribing witnesses.

WILLIAM H. CHURCH.

Witnesses:
ADA E. HAGERTY,
J. A. MILLER.